(12) United States Patent
Couvignou

(10) Patent No.: US 12,157,233 B2
(45) Date of Patent: Dec. 3, 2024

(54) SYSTEMS AND METHODS FOR QUANTITATIVELY MEASURING WHEEL SLIPPAGE IN DIFFERENTIAL DRIVE ROBOTS

(71) Applicant: Brain Corporation, San Diego, CA (US)

(72) Inventor: Philippe Couvignou, San Diego, CA (US)

(73) Assignee: Brain Corporation, San Diego, CA (US)

( * ) Notice: Subject to any disclaimer, the term of this patent is extended or adjusted under 35 U.S.C. 154(b) by 230 days.

(21) Appl. No.: 17/232,481

(22) Filed: Apr. 16, 2021

(65) Prior Publication Data

US 2021/0323156 A1    Oct. 21, 2021

Related U.S. Application Data

(60) Provisional application No. 63/011,483, filed on Apr. 17, 2020.

(51) Int. Cl.
| | | |
|---|---|---|
| B25J 9/16 | (2006.01) | |
| B25J 5/00 | (2006.01) | |
| B25J 9/10 | (2006.01) | |
| B25J 13/08 | (2006.01) | |

(52) U.S. Cl.
CPC .............. *B25J 9/1674* (2013.01); *B25J 5/007* (2013.01); *B25J 9/102* (2013.01); *B25J 13/088* (2013.01)

(58) Field of Classification Search
CPC ......... G05D 1/027; B25J 13/088; B25J 5/007; B25J 9/102; B25J 9/1674
See application file for complete search history.

(56) References Cited

U.S. PATENT DOCUMENTS

| | | | | |
|---|---|---|---|---|
| 7,840,369 B2* | 11/2010 | Lee | ......................... | G01C 19/42 702/179 |
| 8,239,992 B2* | 8/2012 | Schnittman | ........... | A47L 11/302 15/52.1 |
| 8,937,410 B2* | 1/2015 | Comins | .................. | B25J 19/063 307/326 |
| 8,961,695 B2* | 2/2015 | Romanov | ............ | A47L 11/4011 15/340.1 |
| 10,106,383 B2* | 10/2018 | Shen | ...................... | B66F 7/0625 |
| 10,206,550 B2* | 2/2019 | Sheikh | ................. | G05D 1/0274 |
| 10,750,918 B2* | 8/2020 | Jung | ..................... | G05D 1/0238 |
| 2011/0178709 A1* | 7/2011 | Park | ........................ | G09B 29/00 901/1 |
| 2014/0257564 A1* | 9/2014 | Sun | ........................ | B25J 9/0003 700/259 |
| 2018/0050634 A1* | 2/2018 | White | .................... | B60Q 1/543 |
| 2019/0114798 A1* | 4/2019 | Afrouzi | .................. | H04N 23/00 |
| 2021/0018912 A1* | 1/2021 | Dymesich | ............ | G05D 1/0225 |

* cited by examiner

*Primary Examiner* — Dale Moyer
(74) *Attorney, Agent, or Firm* — Pierson Ferdinand LLP; Sidharth Kapoor

(57) ABSTRACT

Systems and methods for quantitatively measuring wheel slippage in differential drive robots are disclosed herein. According to at least one non-limiting exemplary embodiment, data from wheel encoders is compared to data from a gyroscope during execution of at least one of two tests disclosed herein to produce a quantitative value proportional to wheel slippage due to a differential drive robot rotating or turning.

15 Claims, 10 Drawing Sheets

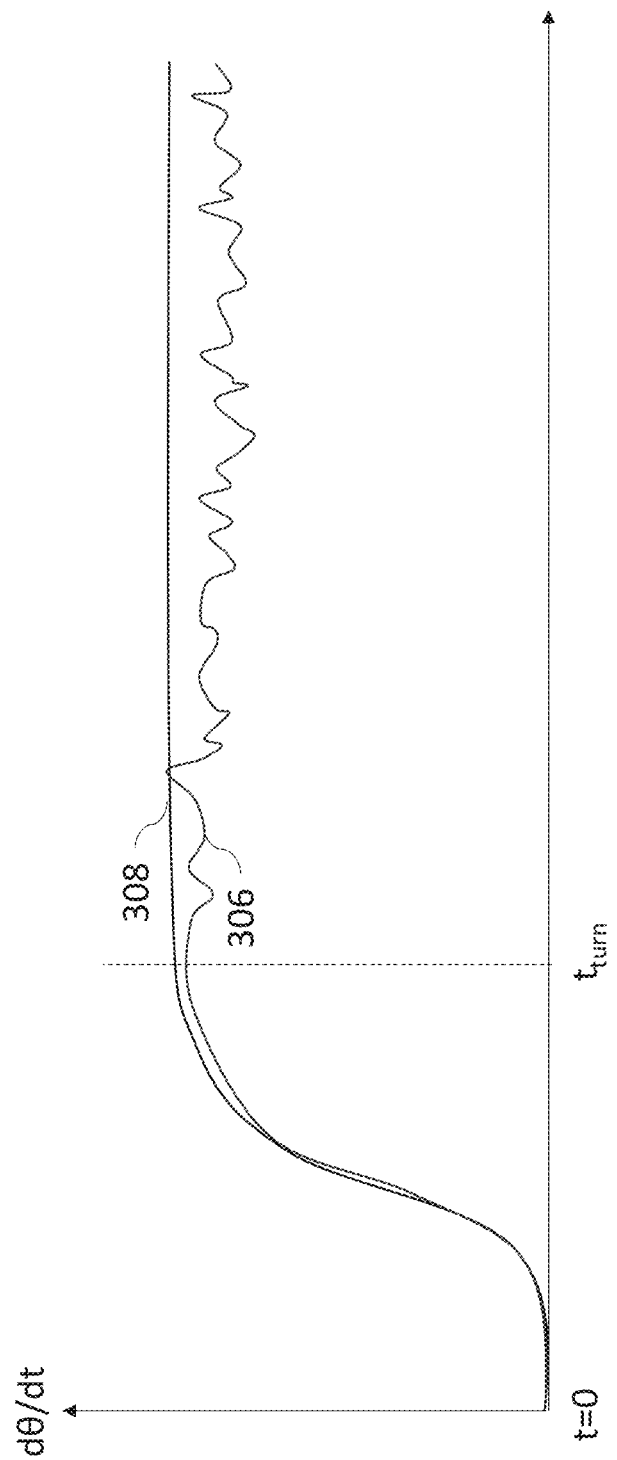

SYSTEMS AND METHODS FOR QUANTITATIVELY MEASURING WHEEL SLIPPAGE IN DIFFERENTIAL DRIVE ROBOTS

PRIORITY

This application claims the benefit of U.S. Provisional Patent Application Ser. No. 63/011,483 filed on Apr. 17, 2020 under 35 U.S.C. § 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNOLOGICAL FIELD

The present application relates generally to robotics, and more specifically to systems and methods for quantitatively measuring wheel slippage in differential drive robots.

SUMMARY

Currently, designing robots can be a difficult challenge. Among the many factors to consider, how well a robot moves and tracks itself upon various floor types is a primary concern for designers constructing robots that operate on one or more floor types, such as, floor covered with carpet, tile, hardwood, vinyl, dirt, grass, etc. Localizing of a robot during its navigation may be critical for the robot to operate effectively and safely. Wheel slippage is a concern for many robot designers as slipping wheels may cause disagreement of a position of a robot between various sensors thereof, which may further lead to delocalization or unsafe and inaccurate navigation of the robot. Methods for measuring wheel slippage for automotive vehicles have been known in the art; however, they typically require either a large space or additional equipment that may be costly for applications in robotics and may not be applicable to differential drive devices. Accordingly, there is a need in the art for systems and methods for quickly and quantitatively measure wheel slippage of differential drive robots that do not require large space and extra equipment.

The foregoing needs are satisfied by the present disclosure, which provides for, inter alia, systems and methods quantitatively measuring wheel slippage in differential drive robots.

Exemplary embodiments described herein have innovative features, no single one of which is indispensable or solely responsible for their desirable attributes. Without limiting the scope of the claims, some of the advantageous features will now be summarized. One skilled in the art would appreciate that as used herein, the term robot may generally refer to an autonomous vehicle or object that travels a route, executes a task, or otherwise moves automatically upon executing or processing computer-readable instructions.

According to at least one non-limiting exemplary embodiment, a method is disclosed. The method comprising a controller of a robot: generating a first signal to actuator units of the robot, the first signal configures the actuator units to turn the robot in place at a maximum turning rate, the robot turning in a first direction; measuring a first value of the yaw rate based on measurements from a gyroscope; measuring a second value of the yaw rate based on measurements of rotational velocity of wheels of the robot using encoders; and determining the yaw slip ratio based on the first value and the second value of the yaw rate.

According to at least one non-limiting exemplary embodiment, the method may further comprise the controller: generating a second signal to actuator units of the robot, the second signal configures the actuator units to turn the robot in place at the maximum turning rate in a second direction opposite the first direction; measuring a third value of the yaw rate based on measurements from the gyroscope; measuring a fourth value of the yaw rate based on measurements of rotational velocity of wheels of the robot using encoders; and determining the yaw slip ratio based on the third value and the fourth value of the yaw rate.

According to at least one non-limiting exemplary embodiment, the method may further comprise the controller: adjusting tension of a wheel suspension spring based on a difference between either of the yaw slip ratio or the average yaw slip ratio and a desired value of the yaw slip ratio.

According to at least one non-limiting exemplary embodiment, the measurements of rotational velocity of wheels of the robot is based on wheel data from wheel encoders.

According to at least one non-limiting exemplary embodiment, the yaw slip ratio is measured on a plurality of floor types, the plurality of floor types including office carpet, ceramic tile, toli carpet, hardwood, linoleum, and basket-weave carpet.

According to at least one non-limiting exemplary embodiment, a method is disclosed. The method comprising a controller of a robot: generating a first signal to actuator units of the robot, the first signal configures the robot to translate forwards at a first velocity; generating a second signal to actuator units of the robot, the second signal configures the robot to execute a turn, the second signal being generated subsequent to the first signal; measuring a first value of the yaw rate from a gyroscope of the robot during execution of the turn; measuring a second value of the yaw rate based on rotational velocity of wheels of the robot during execution of the turn; and determining the yaw slip ratio based on the first and second values of the yaw rate.

According to at least one non-limiting exemplary embodiment, the rotation rate of the turn is chosen based on a track length and the first velocity such that a first wheel of the differential drive is idle during execution of the turn in absence of wheel slippage, the first wheel being an inside wheel during execution of the turn.

According to at least one non-limiting exemplary embodiment, a second wheel of the differential drive moves along a circular path comprising a radius equal to the track length of the differential drive, absent wheel slippage.

According to at least one non-limiting exemplary embodiment, the yaw slip ratio is measured on a plurality of floor types, the plurality of floor types including office carpet, ceramic tile, hardwood, linoleum, and basket-weave carpet.

According to at least one non-limiting exemplary embodiment, the method may further comprise the controller: adjusting tension of a wheel suspension spring based on a difference between ether of the yaw slip ratio or the average yaw slip ratio and a desired value of the yaw slip ratio.

According to at least one non-limiting exemplary embodiment, the first velocity corresponds to a maximum translational speed of the robot.

According to at least one non-limiting exemplary embodiment, the second signal configures an inside wheel of the turn to stop rotating, absent wheel slippage. Further, according to at least one non-limiting exemplary embodiment, the method may comprise determining slippage of the wheels if the first value measured from the gyroscope is different from the second value measured by the encoders; and determining no slippage of the wheels if the first value measured from the gyroscope is equal to the second value measured by the encoders.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the," include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 3B illustrates measurements of a rotational velocity of a robot executing a rotation for use in calculating a yaw slip ratio, according to an exemplary embodiment.

Figure 1A:
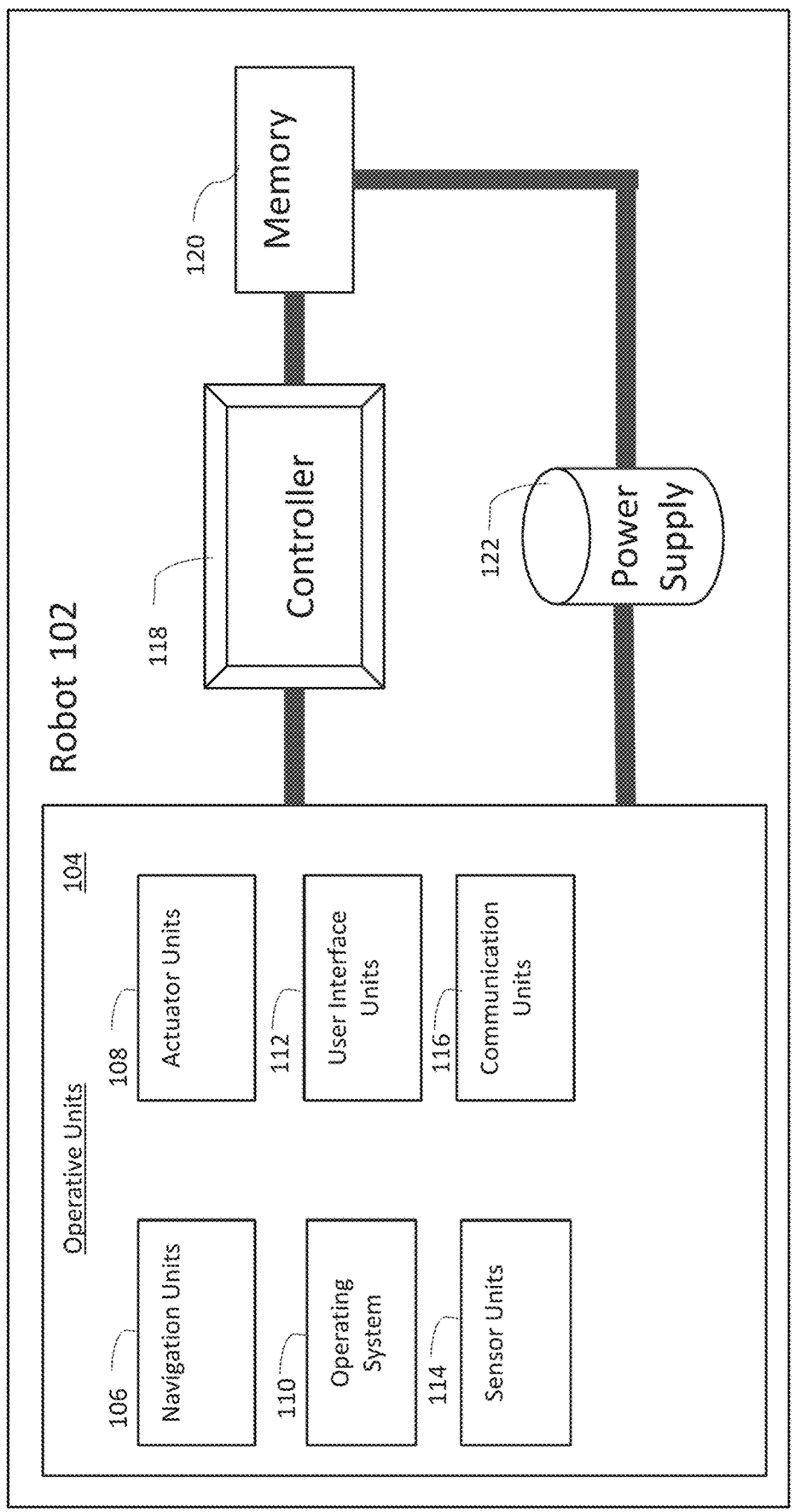
FIG. 1A is a functional block diagram of a main robot in accordance with some embodiments of this disclosure.

All Figures disclosed herein are © Copyright 2021 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for quantitatively measuring wheel slippage in differential drive robots. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, scooters, self-balancing vehicles such as manufactured by Segway, etc.), trailer movers, vehicles, and the like. Robots may also include any autonomous and/or semi-autonomous machine for transporting items, people, animals, cargo, freight, objects, luggage, and/or anything desirable from one location to another.

Many mobile robots use a drive mechanism known as differential drive, which typically consists of two driven rotating members (e.g., wheels, caterpillar tracks, etc.) mounted on a common axis, and each wheel being independently driven either forward or backward (i.e., clockwise or anticlockwise). For example, a differential drive of a wheeled robot corresponds to the robot effectuating its movement based on two separately driven wheels placed on either side of the robot body. It can thus change its direction by varying the relative rate of rotation of its wheels and hence does not require an additional steering motion or mechanism. Such robots may also include other wheels that are not part of the differential drive for supporting the body of the robot.

As used herein, slippage of a wheel may occur when either (i) the wheel translates a distance without rotation, or (ii) the wheel rotates without translation. For example, a robot may execute a sharp turn which may cause one or more wheels to translate a distance due to inertia of the robot. As another example, wheels of a robot may slip if the surface upon which the wheels navigate comprises very low friction (e.g., ice). Both forms of wheel slip or slippage, also referred to within the art as skid, side-slip, or longitudinal slip, are collectively referred to herein as slip or slippage. Slip may occur for other forms of locomotion for mobile robots, such as robots which utilize caterpillar tracks.

As used herein, an end-of-line manufacturing process may comprise a process performed by a manufacturer or designer of a robot prior to the robot being sent or sold to an end user. The process may not occur as a final step before a sale or distribution of the robot, rather the process may follow the manufacturing (i.e., construction) of the robot to, e.g., verify the robot is able to operate safely.

As used herein, a robot is in-field or operates in the field if the robot is and has been used by an end customer. For example, a robot may be considered as operating in the field if an end customer (e.g., purchaser of the robot) has received the robot at the environment of which the robot is to operate within.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include any sequence or human- or machine-cognizable steps that perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) quickly quantify wheel slippage in a differential drive robot; (ii) quantify wheel slippage in a differential drive robot using a small area; and (iii) provide robot designers with quantitative regression testing methods. Other advantages are readily discernible by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Figure 1B:
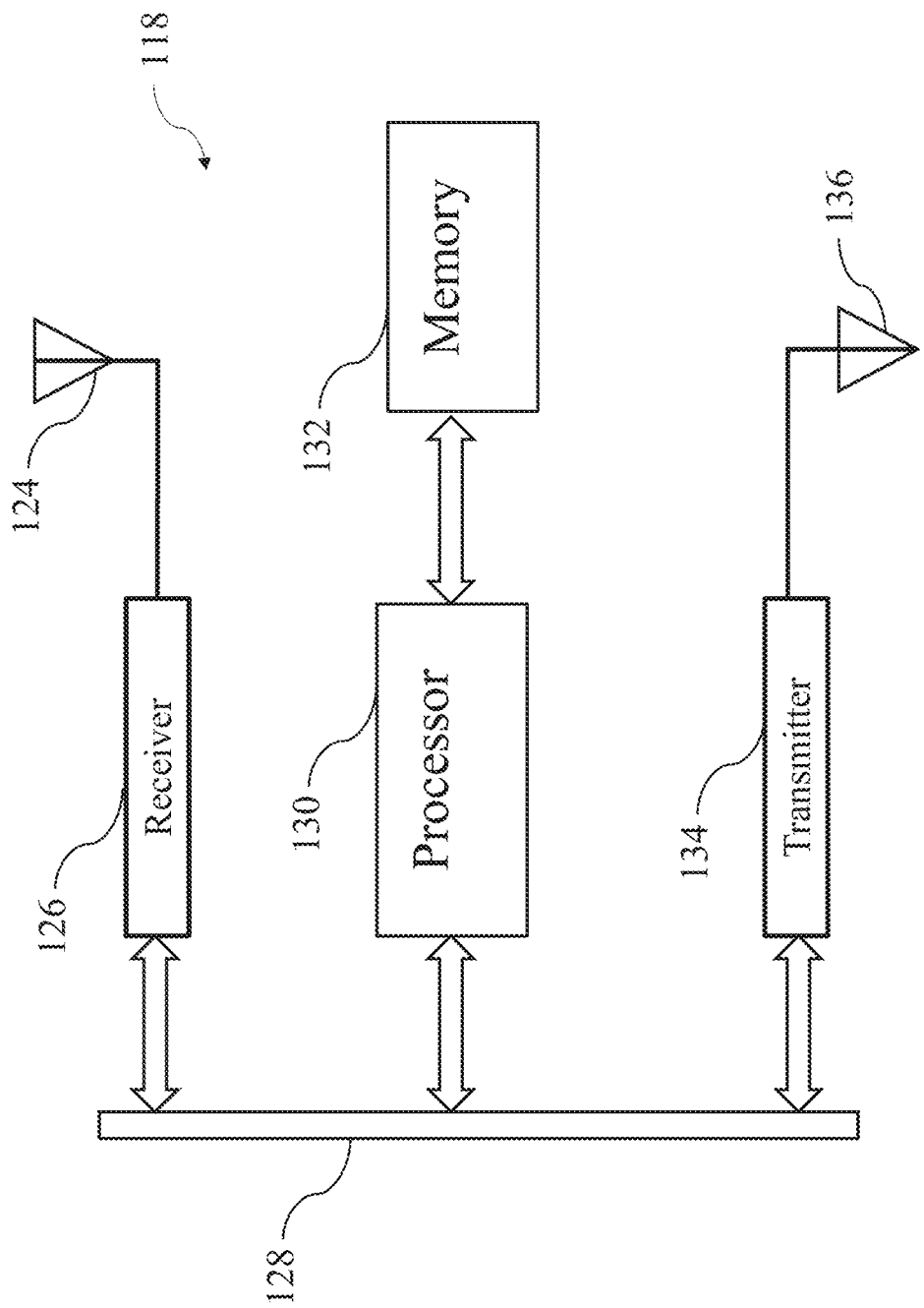
FIG. 1B is a functional block diagram of a controller or processor in accordance with some embodiments of this disclosure.

Controller 118 may control the various operations performed by robot 102. Controller 118 may include and/or comprise one or more processors (e.g., microprocessors) as shown in FIG. 1B, and other peripherals. As previously mentioned and used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments, different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors; and the like.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot or add new features or capabilities to an existing robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, or robot performing a task illustrated in the figures below comprises a controller executing computer readable instructions stored on a non-transitory computer readable storage apparatus, such as memory 120, as would be appreciated by one skilled in the art.

Next referring to FIG. 1B, the architecture of the specialized controller 118 used in the system shown in FIG. 1A is illustrated according to an exemplary embodiment. As illustrated in FIG. 1B, the specialized controller includes a data bus 128, a receiver 126, a transmitter 134, at least one processor 130, and a memory 132. The receiver 126, the processor 130 and the transmitter 134 all communicate with each other via the data bus 128. The processor 130 is a specialized processor configured to execute specialized algorithms. The processor 130 is configured to access the memory 132 that stores computer code or instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configured to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processor 130 via the data bus 128. As one skilled in the art would appreciate, the data bus 128 is the means of communication between the different components—receiver, processor, and transmitter—in the specialized controller 118. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configured to further communicate the output signals to a plurality of operative units 104 illustrated by signal output 136.

One of ordinary skill in the art would appreciate that the architecture illustrated in FIG. 1B may also illustrate an external server architecture configured to effectuate the control of a robotic apparatus from a remote location. That is, the server may also include a data bus, a receiver, a transmitter, a processor, and a memory that stores specialized computer readable instructions thereon.

Figure 1C:
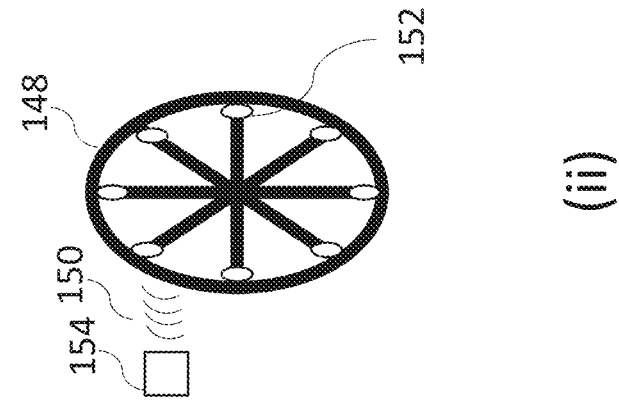
FIG. 1C (i-ii) illustrates two embodiments of a wheel encoder in accordance with some embodiments of this disclosure.
Figure 1C:
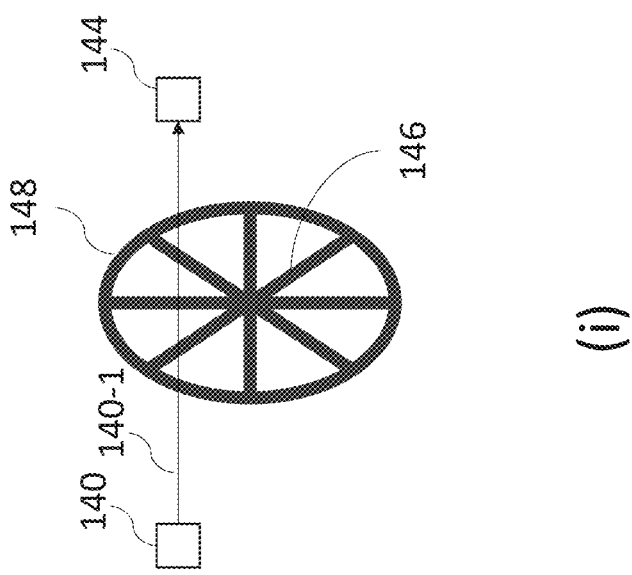

FIG. 1C(i-ii) illustrates two embodiments of a wheel encoder 140, 154 in accordance with some embodiments of the present disclosure. First, in FIG. 1C(i), an optical encoder 140 is depicted. Optical encoder 140 may output a beam 140-1 of electromagnetic energy (e.g., infrared, ultraviolet, visible light, etc.), which is received by a detector 144. As wheel 148 rotates, spokes 146 or other features of the wheel block and unblock the beam 140-1, thereby producing an approximate square wave function at the detector. The period of the square wave is proportional to the speed of the wheel 148 and the duty cycle is proportional to the ratio of the amount of time beam 140-1 is received by the detector 144 to the amount of time beam 140-1 is blocked from reaching the detector 144. One can appreciate that the period of the square wave will vary as the speed of wheel rotation vanes.

According to at least one non-limiting exemplary embodiment, spokes 146 used to block the beam 140-1 may be illustrative of a feature that rotates with the wheel 148. The feature may comprise, for example, a protruding member that may intercept the beam 140-1 upon the wheel 148 making a full rotation, half rotation, quarter rotation, and so forth.

Next, FIG. 1C(ii) illustrates a Hall effect encoder 154. Hall effect encoder 154, which is different from the optical encoder 140 discussed above in reference with FIG. 1C(i), may sense a magnetic field 150 induced due to a rotation of the wheel which causes magnetic sources 152 to approach closer and farther away from the encoder 154, thereby producing another square wave or sinusoidal wave function with frequency proportional to the rotational wheel speed. In some embodiments, magnetic sources 152 comprise permanent magnets (e.g., neodymium magnets) that may be disposed around the circumference of the wheel 148 and at a point where a respective spoke 146 of the wheel 148 connects the circumference of the wheel 148. In some embodiments, a permanent magnet 152 is disposed in a fixed position relative to the rotating wheel 148 while the Hall effect encoder 154 is disposed within the rotating wheel 148, wherein the Hall effect encoder 154 may measure electromotive force (EMF) induced by the magnet when the wheel 148 rotates the encoder 154 near the magnet 152. That is, a plurality of equivalent configurations for detecting a state of a wheel 148 (i.e., its rotational speed) using optical encoders 138 and/or Hall effect encoders 148 are considered without limitation.

These encoders 138, 148, and other wheel encoding methods, are prone to error due to wheel slippage. That is, the wheel 148 may, instead of rotating, slip over a floor, wherein the encoders 138, 148 may not detect the change in position of the wheel 148 and may therefore determine that the wheel 148 is not moving when it instead slipped over a floor consisting of tile, carpet, vinyl, or other characteristics. Slip, as used herein, may correspond to the wheel 148 moving, sliding, being dragged, lifted, or otherwise translating a distance without rotation or rotating an amount less than an expected equal to the distance divided by the circumference of the wheel 148. Slip may further include instances where wheels 148 rotate without translation (e.g., wheels rotating on ice or low friction surfaces).

Gyroscopes, however, may measure rotational speed of the gyroscope (i.e., rotation of the instrument itself), wherein the gyroscope may be placed in a static position within the robot 102. Typically, the gyroscope may be placed in the center of the robot 102 but may be placed in any known location of the robot 102, or be coupled thereto including wired connection or wireless connection. Since the gyroscope measures the rotation of the gyroscope itself, a predetermined transform may be used to translate gyroscopic rotations into rotations made by the robot 102 based on the fixed, known location of the gyroscope within the robot 102. Accordingly, measurements of rotational velocity measured by the gyroscope are independent of any moving parts external to the gyroscopes, such as wheels of a robot 102. Accordingly, measurements from gyroscopes are not subject to error due to wheel slippage whereas measurements from wheel encoders are subject to error due to wheel slippage.

During rotation of the wheels 148 they may experience a "yaw slip." "Yaw slip" corresponds to an amount of wheel slippage observed as a robot 102 (i.e., any robot 102 which operates on a floor) rotates about its yaw axis (e.g., clockwise/counterclockwise as viewed from above), wherein the yaw slip ratio corresponds to a quantitative measure of yaw slip. The yaw slip ratio, as used herein, may be defined following equation 1 below:

$$\sigma_{yaw} = \frac{(\dot{\theta}_{gyro} - \dot{\theta}_{wheels})}{\dot{\theta}_{gyro}} \qquad \text{(Equation 1)}$$

where $\sigma_{yaw}$ is the yaw slip ratio, $\dot{\theta}_{gyro}$ is the angular rotation rate of the robot 102 as measured by a gyroscope, and $\dot{\theta}_{wheels}$ is the calculated rotation rate of the robot 102 based on the rotation of the wheels of the robot 102. $\dot{\theta}_{wheels}$ may be calculated for differential drive robots 102 following equation 2 below:

$$\dot{\theta}_{wheels} = \frac{(R_W \omega_R - R_W \omega_L)}{d} \qquad \text{(Equation 2)}$$

where $R_w$ is a radius of wheels of the robot 102 and $\omega_L$ and $\omega_R$ respectively represent angular rotation rate of the left and right wheels of the robot 102 as measured by wheel encoders. Parameter d is the track length, or distance between two wheels of the differential drive, as illustrated next in FIG. 2. For example, if both $\omega_L$ and $\omega_R$ are the same value, corresponding to the robot 102 moving along a straight line, $\dot{\theta}_{wheels}$ would equal zero. As another example, a differential drive robot 102 executing a clockwise turn in place (i.e., turning about point M, shown in FIG. 2) may be effectuated by rotating both wheels in opposite directions at equal speeds, thereby causing $\omega_L$ and $\omega_R$ to comprise the same value with opposite signs (i.e., + or −) which causes $\dot{\theta}_{wheels}$ to be large.

Figure 2:
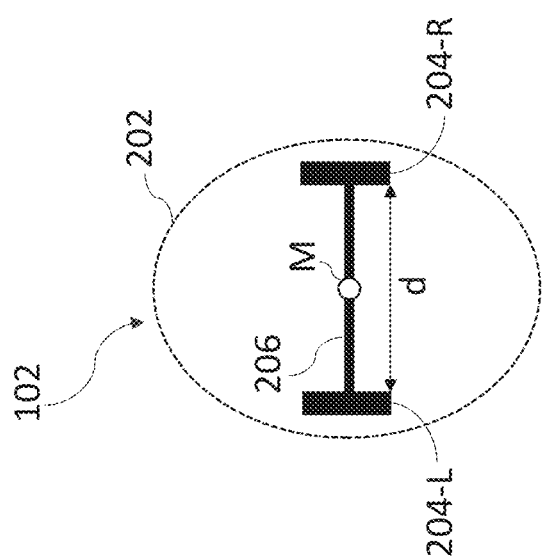
FIG. 2 illustrates a differential drive robot to define parameters in accordance with some embodiments of this disclosure.

FIG. 2 illustrates a footprint 202 of a differential drive robot 102, according to an exemplary embodiment. The differential drive comprises two wheels 204-L and 204-R disposed respectively on the left and right sides of a center axle 206. The center axle 206 comprises a nonzero length of d (inches, meters, centimeters, etc.). A center point M is defined as the geometric center between the two wheels 204-L and 204-R. Point M may be used to define a z-axis extending orthogonally from a floor upon which the wheels 204-L, 204-R rest, wherein yaw rotation is defined as being rotation about the z-axis. Footprint 202 is illustrative of a top-down or bird's-eye view of an area occupied by a body of the robot 102 (omitted for clarity). Footprint 202 may further comprise additional supporting wheel(s) positioned in front of or behind the center point M to support the robot 102 from tipping sideways (i.e., tipping along the axis of the axel 206), forwards and/or backwards (i.e., tipping perpendicular to the axis of the axle 206). In some embodiments, supporting wheel(s) may be positioned anywhere on the robot 102 to configure stability (i.e., avoid tipping) of the robot 102 along other axis. The supporting wheel(s) may be freely rotating and/or passive wheels.

Figure 3A:
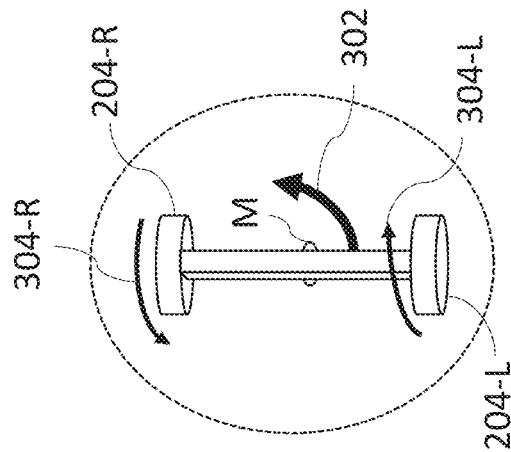
FIG. 3A(i-ii) illustrates a differential drive robot executing a rotation, according to an exemplary embodiment.
Figure 3A:
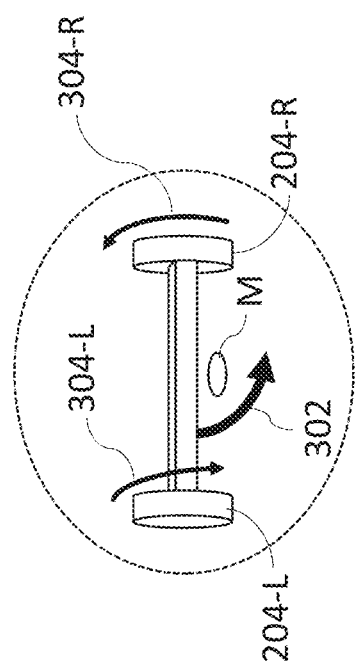

Next, FIG. 3A illustrates a robot 102 executing a first of two tests used to measure the yaw slip ratio, according to an exemplary embodiment. The first test comprises the robot 102, from an initial idle state, activating actuator units 108 to rotate wheels 204-L and 204-R at a maximum rate in opposite directions to cause the robot 102 to spin in place about center point M, the spinning being indicated by rotational velocity vector 302. The rotation of the wheels 204-L, 204-R is illustrated by rotation vectors 304-L, 304-R, which denote the motion of the left and right wheels 204-L, 204-R, respectively. The robot 102 has been illustrated in two positions for clarity to illustrate the rotation during the first test. The direction of velocity vector 302 may be either clockwise or counterclockwise (as shown) without limitation. If no wheel slippage is present, both the gyroscope and encoder measurements of the angular rotation rate of robot 102 should agree, or be of same value; however, some wheel slippage is always present in environments with finite friction.

As the robot 102 begins turning, wheel slippage may occur which causes $\dot{\theta}_{wheels}$ to be of a smaller value than $\dot{\theta}_{gyro}$, thereby causing $\sigma_{yaw}$ to become nonzero. FIG. 3B, for example, illustrates a graph of measurements 304 of $\dot{\theta}_{gyro}$ and measurements 306 of $\dot{\theta}_{wheels}$ over time t in a nonzero-friction environment, according to an exemplary embodiment. Time $t_{turn}$ corresponds to a time at which the robot 102, shown in FIG. 3A, begins turning along vector 302 at a maximum turning speed, wherein the robot 102 maintains turning at the maximum turning speed thereafter. The ramp-up period shown before time $t_{turn}$ corresponds to the robot 102 accelerating the wheels 204-L, 204-R to turn the robot 102 at the maximum rate. Due to $\dot{\theta}_{wheels}$ being subject to error due to wheel slippage, measurement 306 over time is substantially noisier than measurement 304 and comprises smaller values. The noise has been exaggerated for clarity. The graph illustrates the robot 102 continuing the turn indefinitely, however, this is not intended to be limiting. One skilled in the art may configure a robot 102 to turn for a duration of time sufficient to measure $\sigma_{yaw}$ within a desired accuracy, wherein increasing the duration may increase the accuracy of $\sigma_{yaw}$ measured at a cost of increased time to perform the first test.

According to at least one non-limiting exemplary embodiment, the first test may further comprise the robot 102 rotating in an opposite direction to velocity vector 302, wherein $\sigma_{yaw}$ comprises an average between the $\sigma_{yaw,CW}$ measured during clockwise turning and $\sigma_{yaw,CCW}$ measured during counterclockwise turning.

Advantageously, the first test illustrated in FIGS. 3A-B may enable a robot 102, a manufacturer of the robot 102, or operator of the robot 102 to quickly and quantitatively measure wheel slippage without additional equipment (e.g., treadmills, highly precise sensors, etc.). The first test and other tests disclosed herein may be utilized to quickly measure wheel slippage for various floor surfaces and types of which the robot 102 may navigate upon (e.g., carpet, concrete, plaster, tile, etc.). Additionally, the tests may be utilized to determine if modifications to the robot 102 (e.g., axel length, wheel treads, suspension spring stiffness, etc.) increase or reduce wheel slippage for a given floor type. Further, due to the robot 102 spinning in place, the floorspace required to perform measurements of $\sigma_{yaw}$ is reduced to approximately the size of footprint 202; however, additional floor space may be required due to imperfect actuators 108, which rotate the wheels 204 (e.g., actuators 108 which rotate the wheels 204 at different speeds), the wheels 204 slipping as the robot 102 turns (e.g., if the center of mass of the robot 102 is not located at or above point M), and/or as a safety precaution as appreciated by one skilled in the art.

Figure 4A:
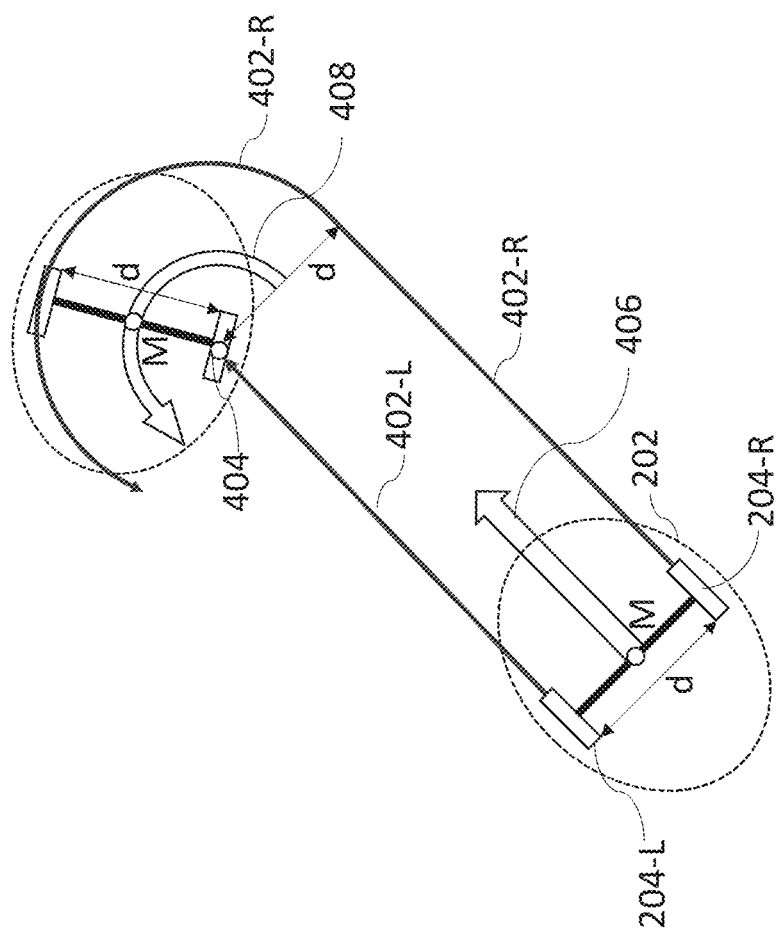
FIG. 4A illustrates a differential drive robot executing a forward movement followed by a rotation, according to an exemplary embodiment.

Next, in FIG. 4A, a second test for measuring $\sigma_{yaw}$ is illustrated, according to an exemplary embodiment. The second test comprises a robot 102, from an initial idle state, accelerating to a target translational velocity, shown by vector 406, and making a sharp sudden turn about point 404, the turn comprising a target rotational velocity, as shown by vector 408. Paths 402-L and 402-R represent paths traveled by wheels 204-L and 204-R, respectively, during the second test and absent wheel slippage. The target translational velocity 406, $V_{target}$, may correspond to the maximum speed of the robot 102.

The target rotational velocity 408, $\dot{\theta}_{target}$, is chosen such that during the turn and absent wheel slippage, the innermost wheel (i.e., 204-L in the illustrated embodiment) remains idle (aside from its rotation about its center point 404) and the outermost wheel (i.e., 204-R) traces a circle of radius d (i.e., the track length) and rotates at the same turning rate it maintained during the translation at $V_{target}$. The target rotational velocity 408, $\dot{\theta}_{target}$, is chosen assuming (i) the innermost wheel (204-L) is able to stop rotating instantaneously (i.e., without regard to the prior translational motion) and (ii) there is no wheel slippage. The target velocities may be calculated using the equations 3-5 below:

$$V_{left} = 0 = V_{target} - \left(\frac{d}{2} * \dot{\theta}_{target}\right) \quad \text{(Equation 3)}$$

$$V_{right} = V_{target} + \left(\frac{d}{2} * \dot{\theta}_{target}\right) \quad \text{(Equation 4)}$$

$$d = \frac{V_{target}}{\dot{\theta}_{target}} \quad \text{(Equation 5)}$$

Setting $V_{left}$ equal to zero (i.e., the intended idle behavior of left wheel 204-L) and $V_{right}$ equal to the maximum turning rate of the right wheel 204-R, $V_{target}$ and $\dot{\theta}_{target}$ may be solved for using a known track length d of the robot 102.

It is appreciated that absent any wheel slippage (i.e., absent friction between wheels 204 and a floor), the path followed by the two wheels 204-L and 204-R follow paths 402-L and 402-R, respectively, exactly as illustrated. Wheel slippage, however, may cause (i) the left wheel 204-L to move or slide from point 404, or (ii) the right wheel 204-R to travel a larger or smaller circular path than path 402-R as illustrated.

Figure 4B:
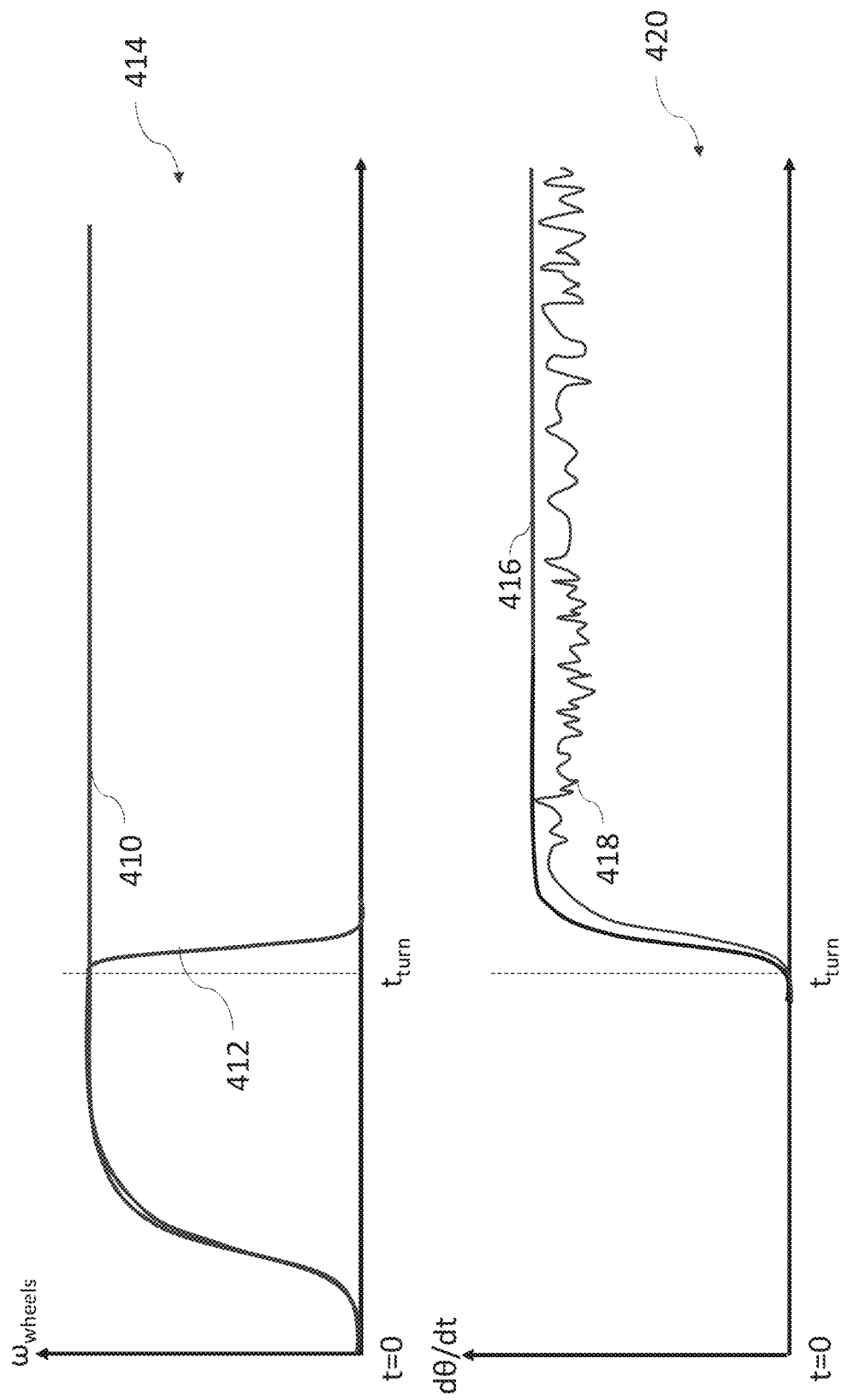
FIG. 4B illustrates measurements of rotational velocity of a robot executing a forward movement followed by a rotation for use in calculating a yaw slip ratio, according to an exemplary embodiment.

FIG. 4B illustrates two graphs 414, 420 which represent changes of parameters over time during execution of the second test for measuring yaw slip ratio $\sigma_{yaw}$ illustrated in FIG. 4A, according to an exemplary embodiment. First, graph 414 plots $\omega_{wheels}$ (i.e., $\dot{\theta}_{wheels}$) for the left wheel 204-L, shown by line 412, and the right wheel 204-R, shown by line 410. Graph 414 is a reference graph illustrating the idealized behavior of both the left wheel 204-L and right wheel 204-R during the second test. Just prior to time $t_{turn}$, both the left wheel 204-L and right wheel 204-R rotate at a maximum velocity. At time $t_{turn}$ the left wheel 204-L is decelerated to a rotational velocity of zero and the right wheel maintains its rotational velocity. Lines 410, 412 may illustrate values for $\omega_R$ and $\omega_L$ of equation 2 shown above to be used to calculate the rotation rate of the robot 102 using data from wheel encoders.

Next, graph 420 illustrates measurements 416 from a gyroscope and measurements from wheel encoders 418 of a rotational velocity of the robot 102 during execution of the second test in an environment with friction. Measurement 418 may correspond to calculated values for $\dot{\theta}_{wheels}$ using equation 2 above, which utilizes data from the wheel encoders (e.g., 138, 148). As shown, the wheel encoder measurement 418 comprises substantially more noise than the gyroscope measurements 416 due to wheel slippage, the noise being exaggerated for clarity. Additionally, and ignoring any potential bias of the gyroscope, the value of the rotational velocity of the robot 102, as measured by the wheel encoders using equation 2, is less than the measured value determined from measurements by the gyroscope due to wheel slippage, as discussed in FIG. 1C above. In some instances, such as during execution of the second test on low-friction surfaces, the values of measurements 418 may exceed the values of measurements 416 as the wheels of the robot 102 may over rotate due to slippage. Stated differently, when rotating on low friction surfaces, the wheels may rotate without traction, corresponding to the wheels rotating without effectuating motion of the robot 102.

According to at least one non-limiting exemplary embodiment, the yaw slip ratio $\sigma_{yaw}$ of equation 1 may be calculated using time averaged values of measurements 416 and 418 after $t_{turn}$. The time averaging comprising an integration or summation of the values of rotational velocity of the robot 102 divided by a time between $t_{turn}$ and a stopping time not illustrated. The stopping time corresponds to a moment when the line 410 begins to decrease.

According to at least one non-limiting exemplary embodiment, the yaw slip ratio $\sigma_{yaw}$ of equation 1 may be calculated as a function of time. That is, equation 1 may be rewritten as follows:

$$\sigma(t)_{yaw} = \frac{(\dot{\theta}(t)_{wheels} - \dot{\theta}(t)_{gyro})}{\dot{\theta}(t)_{gyro}} \quad \text{(Equation 6)}$$

Where $\dot{\theta}(t)_{gyro}$ represents measurements 416 over time, $\dot{\theta}(t)_{wheels}$ represents measurements 418 over time, and $\sigma(t)_{yaw}$ is the yaw slip ratio as a function of time.

Measurement of the yaw slip ratio $\sigma_{yaw}$ may be of use for manufacturers of robots 102 for, for example, regression testing of wheel types, axle lengths d, maximum speeds of the robot 102, and other parameters of equations 1-5. A larger $\sigma_{yaw}$ corresponds to both (i) increased wheel slippage, and (ii) increased disagreement between wheel encoder data and gyroscopic data. With regard to (ii), the disagreement between two sensors used to localize a robot 102 and track its position may cause the robot 102 to become delocalized or localize itself incorrectly. It is advantageous to a manufacturer or designer of robots 102 to minimize wheel slippage for this reason. The above disclosure provides a quick method which requires little space and no external equipment (aside from, e.g., a computer to record and process the data) to identify slip regression between a current model of a robot 102 and a previous or future model of the robot 102.

For example, the designer may desire to test a new wheel comprising a different tread pattern or material than what his/her robots 102 are currently utilizing. The above disclosure provides systems and methods for a quick and quantitative analysis of wheel slippage to determine if the new wheel or previous wheel design work best to reduce wheel slippage. Further, the rapid testing may enable a single designer to test wheel slippage on multiple floor types quickly, such as office carpet, ceramic tile, hardwood, linoleum, and basket-weave carpet. In some instances, the quantitative value of the yaw slip ratio may be useful in fine-tuning of a robot 102. For example, suspension springs of a differential drive robot 102 may be adjusted (e.g., tightened or loosened) and the first and second tests may be performed until the ideal tightness or spring coefficient is determined which minimizes the wheel slippage to at least an acceptable level.

According to at least one non-limiting exemplary embodiment, measurements from the gyroscope may be biased. Bias of a gyroscope may be removed by placing an idle robot 102 comprising the gyroscope on a flat surface. Any nonzero measurement from the gyroscope while the robot 102 is idle upon the flat surface may correspond to the bias and may be subtracted from any measurement collected from the gyroscope during execution of the tests for measuring $\sigma_{yaw}$ as disclosed herein.

It may be appreciated by a skilled artisan that although the above disclosure is described with respect to a first and second test, other tests may be readily envisioned by one skilled in the art given the contents of the present disclosure. The first two tests disclosed above are intended to be illustrative of practical applications of the equations which measure $\sigma_{yaw}$ based on differing measurements from a gyroscope and encoders of a robot 102, wherein measurements from the gyroscope and encoders may be utilized to measure slip of the robot 102 as the robot 102 executes any maneuver. The same principles may be utilized for measuring slip as a robot 102 translates without rotation, however it is appreciated that slow robots (e.g., 5 m/s or less maximum speed) typically do not experience substantial slip during translational motion. Two more exemplary tests are provided below to further illustrate the broad applications of the present disclosure.

According to at least one non-limiting exemplary embodiment, a third test for measuring $\sigma_{yaw}$ may include a robot 102 starting from an initial idle state rotating about one of its wheels. For example, the third test, with reference to FIG. 4A, may correspond to the robot 102 rotating about motion vector 408 from an initial idle state.

According to at least one non-limiting exemplary embodiment, a fourth test for measuring $\sigma_{yaw}$ may include a robot 102 navigating a circular path of any radius (e.g., larger or smaller than d). That is, one skilled in the art given the teachings of the present disclosure may readily envision a plurality of different motions for a robot 102 to execute to measure $\sigma_{yaw}$, wherein the motions may include, at least in part, a rotation of the robot 102. Stated differently, $\sigma_{yaw}$ may be measured during execution of any path which causes a robot 102 to rotate about its yaw axis.

Figure 5:
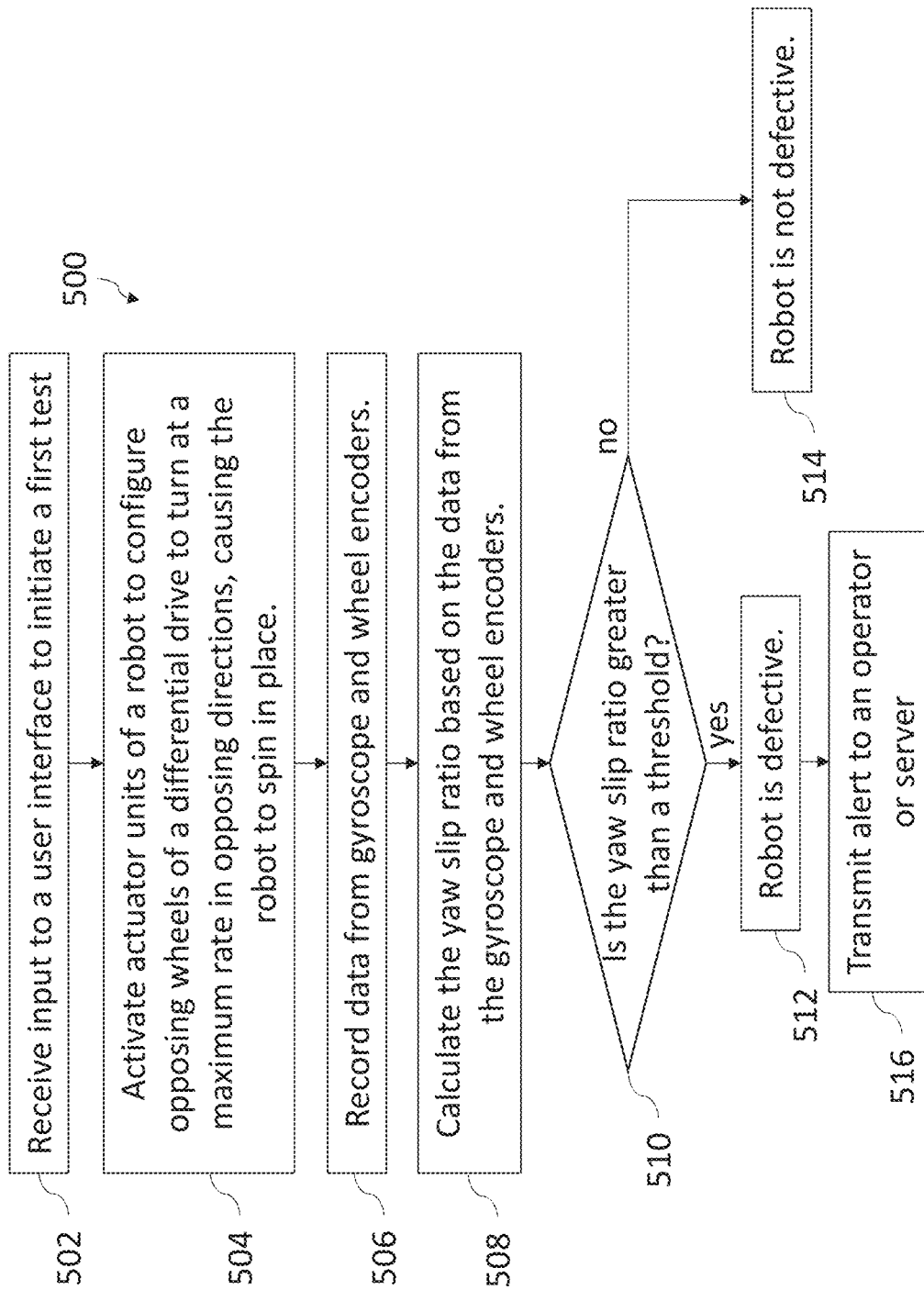
FIG. 5 is a process flow diagram illustrating a method for a robot to execute a first test to measure wheel slippage, according to an exemplary embodiment.

FIG. 5 is a process flow diagram illustrating a method 500 for executing a first spin test for a differential drive robot 102 to determine if the robot 102 is (i) defective or (ii) any changes made to the robot 102 improve or hinder its function, according to an exemplary embodiment. Method 500 may be executed as an end of line procedure by a manufacturer of a robot 102 or may be executed in the field wherever the robot 102 typically operates. It is appreciated that steps of method 500 may be effectuated by a controller 118 of a robot 102 executing computer readable instructions from memory 120.

Block 502 includes the controller 118 receiving a user input to its user interface units 112 to execute a first test. In some instances, the first test may be initiated via a wireless signal communicated to communication units 116 from an external device, such as a personal computer or server.

Block 504 includes the controller 118 executing the first test. The first test, illustrated in FIG. 3A, includes the robot 102 activating both wheels of its differential drive in opposing directions at a maximum rate. In some embodiments, robot 102 may utilize treads or other means for locomotion in its differential drive, wherein these treads may be rotated in a similar manner (i.e., opposing directions at the maximum rate). By activating the actuators 108 to rotate the wheels in opposing directions, the robot 102 may begin to spin in place. If no slip occurs, the robot 102 should spin perfectly in place without skidding. The controller 118 may continue to rotate both wheels at their maximum rate for a predetermined amount of time, e.g., 5 seconds at maximum speed.

Block 506 includes the controller 118 recording data from a gyroscope and wheel encoders while the robot 102 is spinning. The controller 118 may record data from the gyroscope and wheel encoders for the predetermined duration of the first test.

Block 508 includes the controller 118 calculating the yaw slip ratio using data from the gyroscope and wheel encoders. The controller 118 may utilize equation 1, wherein $\dot{\theta}_{gyro}$ and $\dot{\theta}_{wheels}$ may be time-averaged values. Alternatively, controller 118 may utilize equation 6 and measure the yaw slip ratio as a function of time.

Block 510 includes the controller 118 determining if the yaw slip ratio is greater than a threshold value (e.g., greater than 0.1, representing an at least 10% disagreement between wheel encoders and gyroscopic measurements). The yaw slip ratio being greater than the threshold may indicate excessive slippage is present, wherein 'excessive' is relative to the specific robot 102. For example, some robots 102 may be required to navigate with higher precision than others, thereby requiring less wheel slippage to navigate.

In some instances, the yaw slip ratio exceeding a threshold may be used to identify the presence of substantial mechanical issues in the robot 102, such as wobbly wheels or misaligned wheels. Accordingly, the first test may be executed as a method for testing mechanical errors in existing robots. Advantageously, performing the first test on existing robots 102 (i.e., robots which have operated in end-user environments for some time) may enable remote and/or rapid diagnosis of navigation errors caused by mechanical failures.

In exemplary embodiments where equation 6 is utilized, the threshold may be applied to any point in time of the yaw slip ratio function.

Upon the controller 118 determining the yaw slip ratio is above the threshold value, the controller 118 moves to block 512.

Upon the controller 118 determining the yaw slip ratio is below the threshold value, the controller 118 moves to block 514.

Blocks 512 and 514 indicate if the robot 102 is defective or not. Defective, as used herein, is a relative term used to describe an unacceptable level of error in the robotic system. Typical robotic systems may include some tolerance for mechanical errors and sensory calibration errors which are unique to the robotic system. A robot 102 being defective corresponds to the robot 102 being unable to navigate safely and effectively to complete its given purpose/tasks. For example, a large robot 102 may be less tolerant of wheel wobble than a smaller, lighter robot 102 as wheel wobble in both cases may cause the robot 102 to deviate from its desired course, wherein larger robots 102 pose a higher risk of damage.

If robot 102 is found to be defective in blocks 510, 512, controller 118 may proceed to block 516 to transmit an alert to an operator or a server. The alert indicates the presence of a substantial mechanical error which causes the robot 102 to be considered defective. Such alert may be presented on user interface units 112, transmitted to a device of a skilled technician (e.g., a cellphone or personal computer), and/or transmitted to an external server for logging of defective robots 102. Depending on where and when the first test is executed, appropriate action may be determined once the alert is received.

If method 500 is being executed as an end of line manufacturing process (e.g., as quality assurance), defective robots 102 may be fixed by a skilled technician. The skilled technician may, for example, replace the wheels, align the wheels, replace the actuators 108, replace wheel encoders, and/or make other adjustments. That is, method 500 enables the skilled technician to alerted to the presence of potential mechanical errors or errors of the wheel encoders/gyroscope. Further, method 500 may be executed as an end of design process to verify any mechanical changes to an existing robot 102 design do not cause regression (i.e., an increase) in wheel slippage. Although one skilled in the art may appreciate that various other tests, such as calibration checks, may also be performed before a robot 102 is sold or distributed to an end user If method 500 is being executed as an in-field process for existing robots 102, defective robots 102 may be identified such that a skilled technician may be sent to assist the robot 102. That is, method 500 may enable an unskilled robot 102 operator to identify the presence of mechanical issues in their robot 102, as opposed to software, calibration, or other issues (e.g., dirty sensor lenses) or detect faulty wheel encoders and/or broken gyroscopes. According to at least one non-limiting exemplary embodiment, an in-field robot 102 found to be defective using method 500 may have its autonomous functions disabled until a skilled technician resolves the issue as a safety measure.

Advantageously, method 500 provides for rapid testing to identify defective robots 102, both as an end-of line procedure and in-field; identify robots with excessive wheel slippage; and/or for regression testing new designs for robotic systems. The first test disclosed in method 500 occupies a minimal amount of space due to the robot 102 spinning substantially in place.

Figure 6:
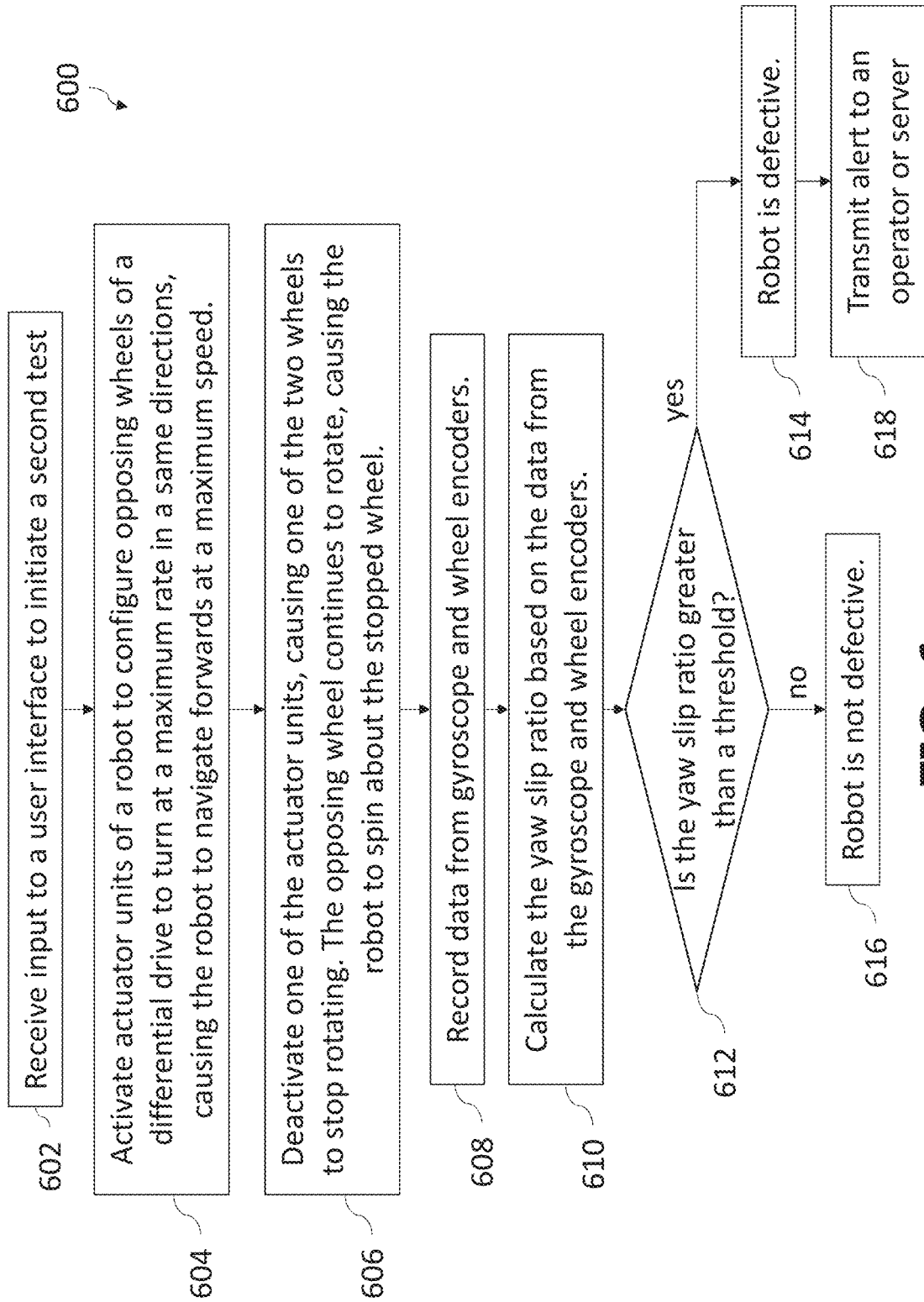
FIG. 6 is a process flow diagram illustrating a method for a robot to execute a second test to measure wheel slippage, according to an exemplary embodiment.

FIG. 6 is a process flow diagram illustrating a method 600 for a robot 102 to execute a second test configured to measure wheel slippage, according to an exemplary embodiment. Method 600 may be executed as an end of line procedure by a manufacturer of a robot 102 or may be executed in the field wherever the robot 102 typically operates; however, unlike the first test, the second test may require additional space to be executed. Thus, it is preferable to execute the second test as an end of line procedure, but it is not limited thereto. It is appreciated that steps of method 600 may be effectuated by a controller 118 of a robot 102 executing computer readable instructions from memory 120.

Block 602 includes the controller 118 receiving a user input to its user interface units 112 to execute the second test. Alternatively, in some embodiments, the second test may begin following receipt of a signal via communications units 116 from an external device, such as a personal computer or server.

Block 604 includes the controller 118 activating actuator units 108 to cause opposing wheels in a differential drive to accelerate to their maximum rate in the same direction, causing the robot 102 to move forwards at its maximum speed. Once the maximum speed has been reached, the controller 118 may move to block 608.

Block 606 includes the controller 118 issuing a signal to actuator units 108 to deactivate or halt one of the two wheels. The opposing wheel continues to rotate at the maximum rate. Ideally, if no slippage is present, the robot 102 would immediately begin to spin around the halted wheel. However, slippage (i.e., skid) may be introduced once the wheel is halted, wherein the robot 102 may skid along the forward direction rather than immediately begin turning.

Block 608 includes the controller 118 recording data from the gyroscope and wheel encoders during the second test.

Block 610 includes the controller 118 calculating the yaw slip ratio based on the data from the wheel encoders and gyroscope. The yaw slip ratio may be calculated using time averaged values for equation 1 or measured as a function of time in equation 6.

Block 612 includes the controller 118 determining if the yaw slip ratio has exceeded a predetermined threshold. The threshold may be determined based on the considerations mentioned in block 510 of FIG. 5 above.

Upon the controller 118 determining the yaw slip ratio is above the threshold value, the controller 118 moves to block 614.

Upon the controller 118 determining the yaw slip ratio is below the threshold value, the controller 118 moves to block 616.

Block 614 denotes the robot 102 as being defective. As discussed above in FIG. 5, a skilled technician may be alerted to fix the mechanical issue of the robot 102 by, e.g., adjusting the wheels, replacing the wheels, replacing the wheel encoders, or making other adjustments of this disclosure. Similar to method 500, if the robot 102 is found to be defective, the autonomous features of the robot 102 may be disabled for safety.

Once a robot 102 is denoted as defective, controller 118 may move to block 618 and issue an alert to an operator or server indicating the presence of substantial mechanical or some sensory errors, specifically of the gyroscope or wheel encoders. The alert may be transmitted in a similar manner as the alert in block 516 of FIG. 5 above. In short, the alert may request a skilled technician to check the robot 102 for mechanical issues, such as loose screws, wobbly wheels, misaligned axels, etc. Further, the alert may indicate the presence of a broken/malfunctioning gyroscope and/or wheel encoders, wherein the skilled technician may review the data recorded in block 608 to determine if the error is caused by faults of these sensors. If method 600 is being executed as an in-field process, the skilled technician may review the encoder and gyroscope data by requesting the data from the server. The skilled technician may repeat method 600 to verify any changes made to the robot 102 improve (i.e., reduce) the yaw slip ratio below the threshold of block 612. In some instances, however, a defective robot 102 may be discarded as the cost to repair it may exceed the cost to produce another robot 102.

If method 600 is being executed as an in-field diagnosis procedure for detecting substantial wheel slippage, the alert transmitted in block 618 may be communicated to a server. The server may then alert a skilled technician in a remote location to the presence of a defective robot 102 being used by a customer. The technician may then go to the location of the robot 102 and perform necessary maintenance/repairs.

Block 616 denotes the robot 102 as not being defective. Accordingly, the robot 102 may be deemed safe to operate autonomously. That is, the wheel slippage experienced by the robot 102 under the extreme scenario of the second test (i.e., an immediate turn at a maximum speed) is within tolerable ranges. If method 600 is being executed as an end of line process, the robot 102 may be deemed safe to operate from a wheel slippage or mechanical perspective. Although one skilled in the art may appreciate that various other tests, such as calibration checks, may also be performed before a robot 102 is sold or distributed to an end user. If method 600 is being executed as an in-field process, the robot 102 may be deemed safe to operate and continue its normal operations.

Advantageously, method 600 provides for another quick method for testing slip, more specifically skid experienced when the robot 102 changes direction. Although method 600 requires more space than method 500, method 600 may be utilized to verify the conclusions of method 500 to further identify whether a problem of the robot 102 relates to the mechanical components of the differential drive.

It will be recognized that, while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" or the abbreviation "e.g." is used to provide exemplary instances of the item in discussion, not an exhaustive or limiting list thereof, and should be interpreted as "example, but without limitation;" the term "illustration" is used to provide illustrative instances of the item in discussion, not an exhaustive or limiting list thereof, and should be interpreted as "illustration, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein, "defined" or "determined" may include "predefined" or "predetermined" and/or otherwise determined values, conditions, thresholds, measurements, and the like.

What is claimed is:

1. A method for measuring slip in a differential drive robot, comprising:
   generating, via a controller, a first signal to actuator units of the robot, the first signal configured to turn the robot in place for a distance greater than or equal to a circumference of a circle of a diameter equal to a track length of the robot at a maximum turning rate in a first direction, wherein both wheels of the differential drive rotate in opposing directions at a maximum turning rate, the first signal is generated in response to a user input;
   measuring a first value of a yaw rate based on measurements from a gyroscope of the robot, the gyroscope measures the first value of the yaw rate of the robot;
   measuring a second value of the yaw rate based on measurements of rotational velocity of wheels of the robot using encoders, the encoders measure the rotation of the wheels of the differential drive, the second value being based on the number of rotations of the wheels; and
   determining a yaw slip ratio based on the first value and the second value of the yaw rate; and
   responsive to a determination that the yaw slip ratio exceeds a threshold value, transmit an alert signal to a server.

2. The method of claim 1, further comprising:
   generating a second signal to actuator units of the robot, the second signal configured to turn the robot in place at the maximum turning rate in a second direction opposite the first direction, the second signal is generated in response to a second user input;
   measuring a third value of the yaw rate based on measurements from the gyroscope;
   measuring a fourth value of the yaw rate based on measurements of rotational velocity of wheels of the robot using encoders; and
   determining the yaw slip ratio based on the third value and the fourth value of the yaw rate.

3. The method of claim 2, further comprising:
   adjusting tension of a wheel suspension spring based on a difference between either of the yaw slip ratio or an average yaw slip ratio and a desired value of the yaw slip ratio.

4. The method of claim 1, wherein, the measurements of rotational velocity of wheels of the robot is based on data from the encoders.

5. The method of claim 1, wherein, the yaw slip ratio is measured on a plurality of floor types, the plurality of floor types comprise office carpet, ceramic tile, toli carpet, hardwood, linoleum, and basket-weave carpet.

6. A method for measuring slip in a differential drive robot, comprising:
   generating a first signal to actuator units of the robot, the first signal configure to translate the robot forward at a first velocity, the first signal is generated in response to a user input, the first velocity corresponds to a maximum speed of the robot;
   generating a second signal to actuator units of the robot, the second signal configures the robot to execute a turn of a distance greater than or equal to a circumference of a circle of a radius equal to a track length of the robot, the second signal being generated subsequent to the first signal, the turn comprises halting one of either actuator units while maintaining speed of the other actuator unit;
   measuring a first value of a yaw rate based on measurements from a gyroscope of the robot, the gyroscope measures the first value of the yaw rate of the robot;
   measuring a second value of the yaw rate based on measurements of rotational velocity of wheels of the robot using encoders, the encoders measure the rotation of the wheels of the differential drive, the second value being based on the number of rotations of the wheels; and
   determining a yaw slip ratio based on the first and second values of the yaw rate.

7. The method of claim 6, wherein,
   the rotation rate of the turn is selected based on a track length and the first velocity such that a first wheel of the differential drive is idle during execution of the turn in absence of wheel slippage and a second wheel of the differential drive moves along a circular path.

8. The method of claim 7, wherein,
   the first wheel is an inside wheel during execution of the turn, and
   the circular path comprising a radius equal to the track length of the differential drive absent wheel slippage.

9. The method of claim 6, wherein,
   the yaw slip ratio is measured on a plurality of floor types, the plurality of floor types including office carpet, ceramic tile, toli carpet, hardwood, linoleum, and basket-weave carpet.

10. The method of claim 6, further comprising:
    adjusting tension of a wheel suspension spring based on a difference between either of the yaw slip ratio or an average yaw slip ratio and a desired value of the yaw slip ratio.

11. The method of claim 6, wherein,
    the first velocity corresponds to a maximum translational speed of the robot.

12. The method of claim 6, wherein,
the second signal configures an inside wheel of the turn to stop rotating, absent wheel slippage.

13. A method for measuring slip in a differential drive robot, comprising:
generating a first signal to actuator units of the robot, the first signal configures the actuator units to turn the robot in place for a distance greater than or equal to a circumference of a circle of a radius equal to a track length of the robot at a maximum turning rate in a first direction, wherein both wheels of the differential drive rotate in opposing directions at a maximum turning rate, the first signal is generated in response to a user input;
measuring a first value of a yaw rate based on measurements from a gyroscope of the robot, the gyroscope measures the first value of the yaw rate of the robot;
measuring a second value of the yaw rate based on measurements of rotational velocity of wheels of the robot using encoders, the encoders measure the rotation of the wheels of the differential drive, the second value being based on the number of rotations of the wheels; and
determining the yaw slip ratio based on the first value and the second value of the yaw rate; generating a second signal to actuator units of the robot, the second signal configures
the actuator units to turn the robot in place at the maximum turning rate in a second direction opposite the first direction;
measuring a third value of the yaw rate based on measurements from the gyroscope;
measuring a fourth value of the yaw rate based on measurements of rotational velocity of wheels of the robot using encoders; and
determining a yaw slip ratio based on the third value and the fourth value of the yaw rate.

14. The method of claim 13, further comprising:
determining slippage of the wheels if the first value measured from the gyroscope is different from the second value measured by the encoders.

15. The method of claim 13, further comprising:
determining no slippage of the wheels if the first value measured from the gyroscope is equal to the second value measured by the encoders.

\* \* \* \* \*